(12) United States Patent
Zhang et al.

(10) Patent No.: US 9,537,375 B2
(45) Date of Patent: Jan. 3, 2017

(54) THERMAL CONDUCTOR FOR USE IN AN ELECTRIC MACHINE AND METHOD OF FORMING THE SAME

(71) Applicant: General Electric Company, Schenectady, NY (US)

(72) Inventors: Wei Zhang, Ballston Lake, NY (US); Xiaomei Fang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 616 days.

(21) Appl. No.: 13/891,671

(22) Filed: May 10, 2013

(65) Prior Publication Data

US 2014/0333160 A1    Nov. 13, 2014

(51) Int. Cl.
*H02K 9/22*    (2006.01)

(52) U.S. Cl.
CPC ...................................... *H02K 9/22* (2013.01)

(58) Field of Classification Search
CPC .......... H02K 9/22; H02K 3/50; H02K 15/0043
USPC .............................. 310/64, 43, 254.1, 260, 52
See application file for complete search history.

(56) References Cited

U.S. PATENT DOCUMENTS

| | | | |
|---|---|---|---|
| 3,075,107 A * | 1/1963 | Eis ........................... | H02K 9/22 310/260 |
| 3,192,861 A | 7/1965 | Haegh | |
| 3,345,145 A * | 10/1967 | Pijls ...................... | F16B 11/006 428/607 |
| 3,577,024 A | 5/1971 | Inagaki et al. | |
| 3,609,420 A | 9/1971 | Inagaki et al. | |
| 3,805,101 A | 4/1974 | Purman | |
| 4,517,479 A | 5/1985 | Aleem et al. | |
| 5,053,658 A * | 10/1991 | Fakler ....................... | H02K 3/38 310/263 |
| 5,081,382 A | 1/1992 | Collings et al. | |
| 6,583,532 B2 * | 6/2003 | Hein ......................... | H02K 9/22 310/260 |
| 6,744,158 B2 * | 6/2004 | Liang ....................... | H02K 9/22 310/43 |
| 8,207,642 B2 | 6/2012 | Lafontaine et al. | |
| 8,247,933 B2 | 8/2012 | Dang et al. | |
| 2007/0228846 A1 * | 10/2007 | Rao ......................... | H02K 3/345 310/52 |

(Continued)

OTHER PUBLICATIONS

Coefficients of Linear Thermal Expansion. Table [online]. The Engineering ToolBox.com [retrieved on Jan. 27, 2016]. Retrieved from the internet <URL: http://www.engineeringtoolbox.com/linear-expansion-coefficients-d_95.html>.*

(Continued)

*Primary Examiner* — Quyen Leung
*Assistant Examiner* — Noli Manaloto
(74) *Attorney, Agent, or Firm* — John P. Darling

(57) ABSTRACT

An electric machine includes a housing, a stator core positioned within the housing, a wire wound about the stator core to form a plurality of end-turns that extend from an end of the stator core, and a thermal conductor positioned between the plurality of end-turns and the housing. The thermal conductor includes a substrate and a thermally conductive coating formed on a surface of the substrate. The thermally conductive coating includes a thermally conductive, dielectric material configured to transfer heat from the plurality of end-turns to the substrate.

10 Claims, 4 Drawing Sheets

(56) References Cited

U.S. PATENT DOCUMENTS

| | | | |
|---|---|---|---|
| 2008/0218015 A1* | 9/2008 | Weeber | C22C 19/055 |
| | | | 310/86 |
| 2010/0039482 A1* | 2/2010 | Fujii et al. | 347/68 |
| 2011/0234029 A1 | 9/2011 | Pal | |
| 2012/0074799 A1 | 3/2012 | Bradfield | |
| 2012/0112571 A1* | 5/2012 | Stephens | H02K 11/0005 |
| | | | 310/55 |
| 2013/0069455 A1* | 3/2013 | Hamer | H02K 9/22 |
| | | | 310/54 |

OTHER PUBLICATIONS

Magnesia—Magnesium Oxide (MgO) Properties & Applications. Table [online]. AZoM.com [retrieved on Jan. 27, 2016]. Retrieved from the internet <URL: http://www.azom.com/properties.aspx?ArticleID=54>.*

Thermal Conductivity Conversions. [online]. Online Unit Converter PRO.com [retrieved on Jan. 27, 2016]. Retrieved from the Internet <URL: http://online.unitconverterpro.com/unit-conversion/convert-alpha/convert.php?cat=thermal-conductivity>.*

* cited by examiner

THERMAL CONDUCTOR FOR USE IN AN ELECTRIC MACHINE AND METHOD OF FORMING THE SAME

BACKGROUND

The present disclosure relates generally to electric machines and, more specifically, to a thermal conductor and methods for forming the thermal conductor for use in electric machines.

At least some known electric machines, such as electric generators and electric motors, may be fabricated in a variety of configurations and may be used in a wide array of applications. Electric machines generally produce energy through induced rotational forces and induced torque that are applied to a rotor shaft of the electric machine. Generally, electric machines generate heat during operation as a result of both electrical and mechanical losses. For example, heat may be generated by a process commonly referred to as Joule heating when current is applied through a stator winding of the electric machine during operation. The amount of heat generated by Joule heating is generally dependent on the amount of current applied through the stator wire, and the electrical resistance of the wire. Generally, the power density of an electric machine may correspond to the amount of heat generated therein. In at least some known electric machines, the greatest amount of heat is generated at the end-turns of the stator winding.

One known method of dissipating heat generated at the stator end-turns of an electric machine is to position a thermally conductive layer between the end-turns and the housing of the electric machine. At least some known thermal conductors are fabricated from a polyimide material, a fiberglass material, and/or a varnish material. However, polyimide-based thermal conductors generally have a low thermal conductivity that limits the heat dissipation from the end-turns. Another known method includes spray cooling a portion of the electric machine with a flow of dielectric cooling liquid. However, spray cooling requires the use of a complex system of components to supply the liquid to the electric machine.

SUMMARY

In one aspect, an electric machine is provided. The electric machine includes a housing, a stator core positioned within the housing, a wire wound about the stator core to form a plurality of end-turns that extend from an end of the stator core, and a thermal conductor positioned between the plurality of end-turns and the housing. The thermal conductor includes a substrate and a thermally conductive coating formed on a surface of the substrate. The thermally conductive coating includes a thermally conductive, dielectric material configured to transfer heat from the plurality of end-turns to the substrate.

In yet another aspect, a method of forming a thermal conductor for use in an electric machine is provided. The method includes fabricating a substrate and forming at least one layer of a thermally conductive coating on at least a portion of a surface of the substrate. The thermally conductive coating includes a thermally conductive, dielectric material configured to transfer heat from within the electric machine to the substrate.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of the present disclosure relate to a dielectric thermal conductor and methods for forming the thermal conductor that facilitates dissipating heat generated at hotspot regions within an electric machine. More specifically, the thermal conductor described herein is configured to dissipate heat at the stator end-turn regions of an electric machine. In the exemplary embodiments, the thermal conductor includes a substrate, a transition material applied to a surface of the substrate, and a thermally conductive, dielectric material applied to the transition material. The thermal conductor may be positioned between the housing of the electric machine and the stator end-turn regions. During operation, heat generated at the stator end-turns may be transferred through the thermal conductor and released from the electric machine. More specifically, the conductive material is fabricated from a material that has a higher thermal conductivity than other known thermal conductors currently used in electric machines. As such, the thermal conductor described herein facilitates dissipating heat from within the electric machine more effectively, which facilitates increasing the power density of the electric machine.

Figure 1:
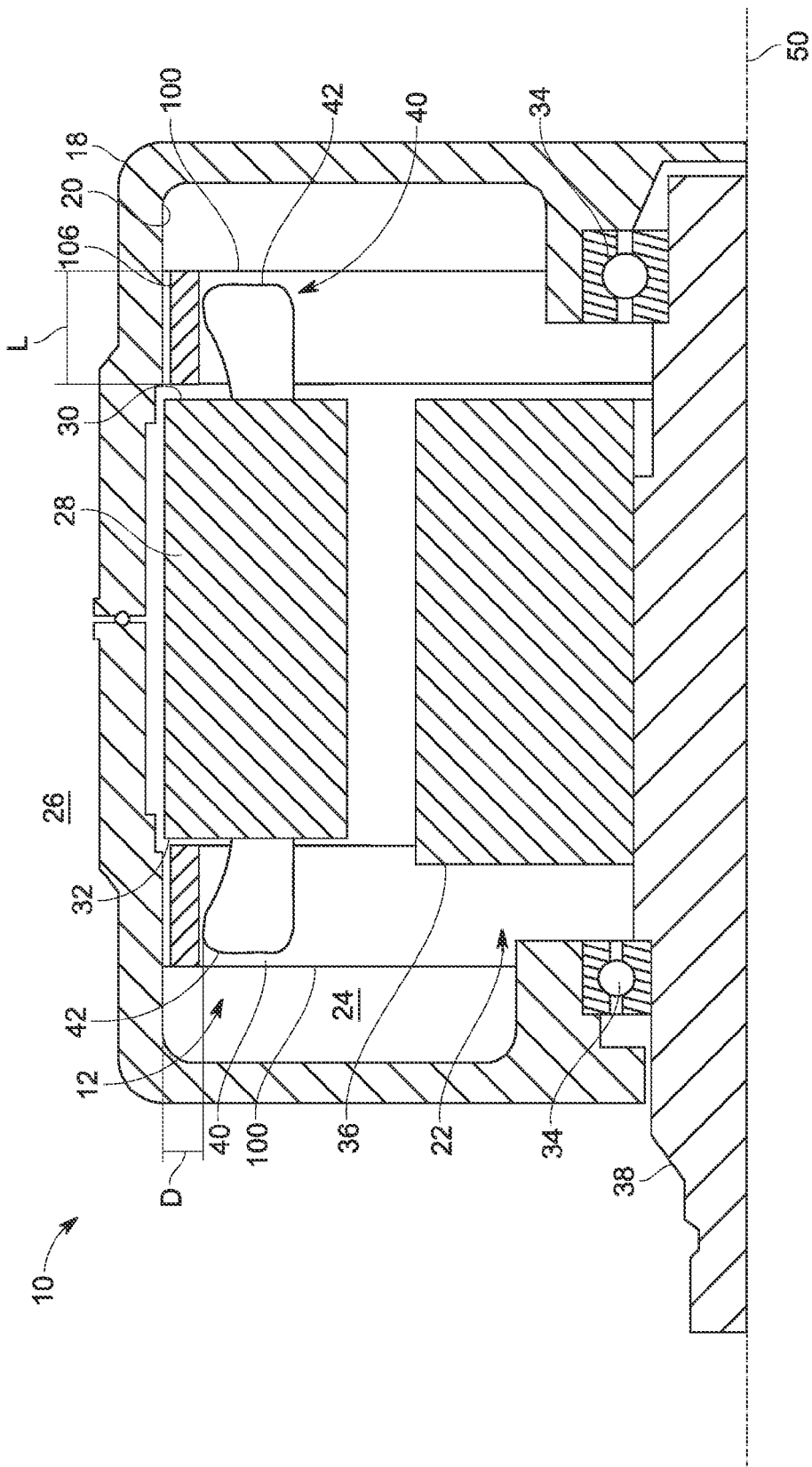
FIG. 1 is a cross-sectional view of an exemplary electric machine.

FIG. 1 is a cross-sectional view of an exemplary electric machine 10. In the exemplary embodiment, electric machine 10 includes a stationary assembly 12 and a rotatable assembly 22 positioned within a housing 18. Housing 18 defines an interior 24 and an exterior 26 of machine 10 and is configured to at least partially enclose and protect stationary assembly 12 and rotatable assembly 22. Stationary assembly 12 includes a stator core 28 and wire winding 40 wound about stator core 28. Wire winding 40 forms end-turns 42 that extend from a first end 30 and a second end 32 of stator core 28.

In one embodiment, stationary assembly 12 is a three phase salient pole stator assembly, and stator core 28 is formed from a stack of laminations (not shown) manufactured from at least one magnetically permeable material. In the exemplary embodiment, the plurality of laminations that form stator core 28 may be either interlocked or loose laminations. In an alternative embodiment, stator core 28 is a solid core. For example, stator core 28 may be formed from a soft magnetic composite (SMC) material, a soft magnetic alloy (SMA) material, and/or a powdered ferrite material using a sintering process.

In one embodiment, rotatable assembly 22 includes a permanent magnet rotor core 36 and a shaft 38 supported by bearings 34. In the exemplary embodiment, rotor core 36 is formed from a stack of laminations manufactured from at least one magnetically permeable material and is substantially received in a central bore (not shown) of stator core 28. While FIG. 1 is an illustration of a three phase electric motor, the motor described herein may be included within machines having any number of phases, including single phase and multiple phase electric machines. Further, electric machine 10 may be any type of electric motor such as, but not limited to, an induction motor, a brushless direct current (BLDC) motor, an electronically commutated motor (ECM), a brushless alternating current (BLAC) motor, or a stepper motor.

In the exemplary embodiment, a thermal conductor 100 fabricated from thermally conductive, dielectric material is positioned between end-turns 42 and housing 18 to facilitate dissipating heat generated at end-turns 42 during operation of electric machine 10. More specifically, in the exemplary embodiment, thermal conductor 100 extends circumferentially about a longitudinal axis 50 of electric machine 10 between end-turns 42 and housing 18. In some embodiments, thermal conductor 100 is positioned such that an outer surface 106 of thermal conductor 100 may be coupled to an inner surface 20 of housing 18, and such that a thermally conductive layer (not shown in FIG. 1) included in thermal conductor 100 may be coupled to end-turns 42. As such, heat generated at end-turns 42 may be transferred through thermal conductor 100 and dissipated from electric machine 10 while facilitating maintaining electrically-insulative properties.

Figure 2:
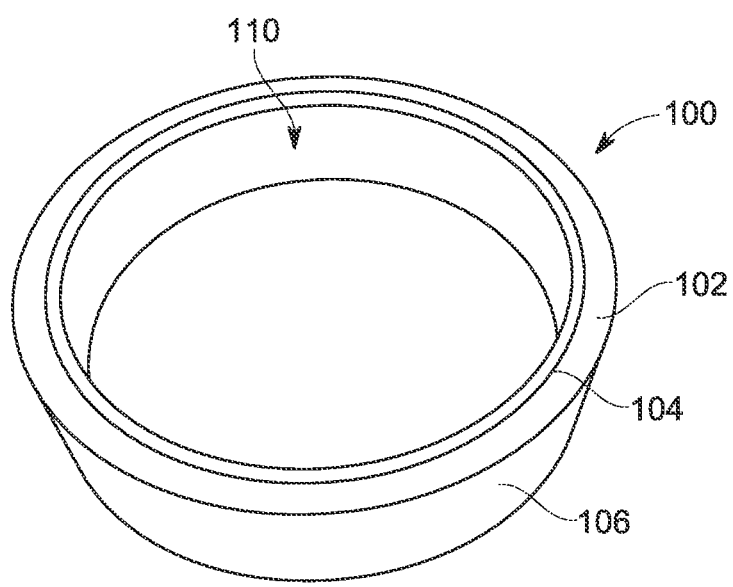
FIG. 2 is a perspective view of an exemplary thermal conductor that may be used with the electric machine shown in FIG. 1.
Figure 3:
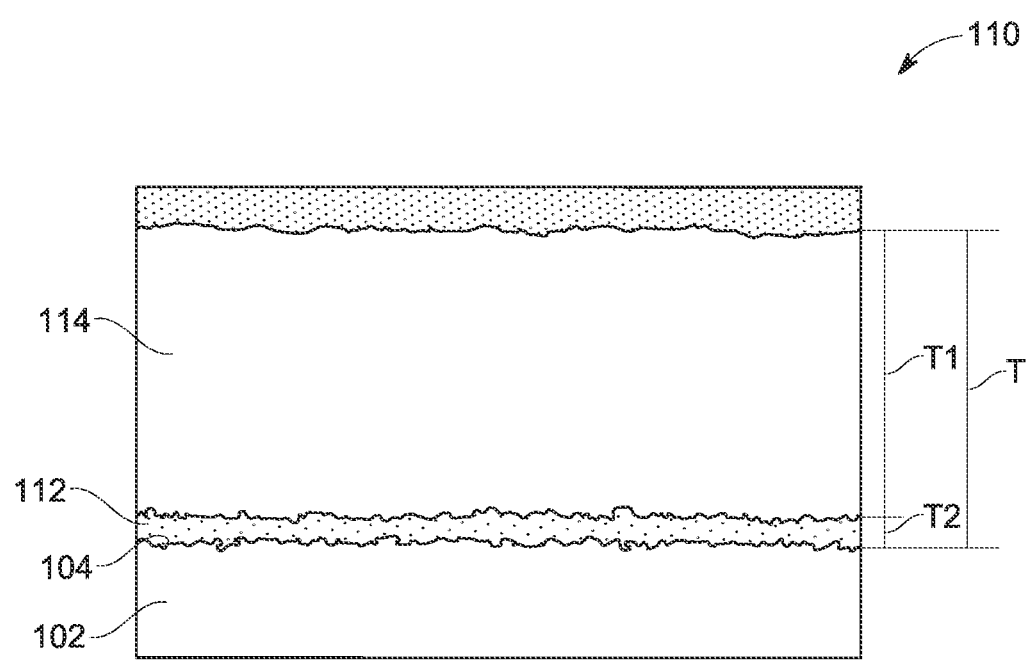
FIG. 3 is an enlarged cross-sectional view of an exemplary thermal coating that may be used with the thermal conductor shown in FIG. 2.

FIG. 2 is a perspective view of thermal conductor 100, and FIG. 3 is an enlarged cross-sectional view of an exemplary thermally conductive coating 110. In the exemplary embodiment, thermal conductor 100 includes a substrate 102 and thermally conductive coating 110 formed on an inner surface 104 of substrate 102. In some embodiments, thermal conductor 100, and more specifically substrate 102, has a substantially cylindrical cross-sectional shape. In alternative embodiments, substrate 102 may have any shape that enables thermal conductor 100 to function as described herein such as, but not limited to, a frusto-conical shape, and a truncated substantially cylindrical cross-sectional shape. In some embodiments, substrate 102 has a length L (shown in FIG. 1) that enables thermal conductor 100 to extend beyond end-turns 42 with respect to longitudinal axis 50 (both shown in FIG. 1).

Substrate 102 may be fabricated from any material that enables thermal conductor 100 to function as described herein. In the exemplary embodiment, substrate 102 is fabricated from a metallic material. As used herein, the term "metallic" may refer to a single metal or a metal alloy. An exemplary metal material includes, but is not limited to, an aluminum material, a titanium material, and a steel material.

In the exemplary embodiment, thermally conductive coating 110 includes a transition layer 112 formed on inner surface 104 of substrate 102, and a thermally conductive layer 114 formed on transition layer 112. Transition layer 112 and thermally conductive layer 114 may each be formed from any material that enables thermally conductive coating 110 to function as described herein. An exemplary material used to fabricate transition layer 112 includes, but is not limited to, a nickel-chromium alloy, and a hybrid metal-ceramic bond coat material. Exemplary materials used to fabricate thermally conductive layer 114 include, but are not limited to, aluminum oxide, magnesium oxide, diamond, boron nitride, aluminum nitride, and other nitride-based powders. In some embodiments, substrate 102 is fabricated from an aluminum material, transition layer 112 is fabricated from a nickel-chromium alloy, and thermally conductive layer 114 is fabricated from aluminum oxide.

In the embodiments of the present disclosure, thermally conductive coating 110 has a thickness T defined within a range between about 0.25 millimeters (mm) (0.01 inch (in)) and about 1.5 mm (0.06 in), thermally conductive layer 114 has a thickness T1 defined within a range between about 0.5 mm (0.019 in) and about 1.0 mm (0.039 in), and transition layer 112 has a thickness T2 within a range between about 50 micrometers (μm) (0.002 in) and about 200 μm (0.008 in). In the exemplary embodiment, thickness T1 is selected to facilitate reducing eddy current loss in electric machine 10 (shown in FIG. 1). More specifically, thickness T1 is selected to facilitate closing a gap distance D between end-turns 42 and housing inner surface 20 (shown in FIG. 1).

In some embodiments, the material used to form transition layer 112 is selected to facilitate alleviating a mismatch in rates of thermal expansion between thermally conductive layer 114 and substrate 102. For example, aluminum has a thermal expansion coefficient of about $22.2*10^{-6}$ per degree Kelvin (° K) and aluminum oxide has a thermal expansion coefficient of about $8.1*10^{-6}$/° K. As such, the material used to fabricate transition layer 112 is selected to have a rate of thermal expansion between the rates of thermal expansion of the material used to fabricate substrate 102 and thermally conductive layer 114. Accordingly, materials used to fabricate thermal conductor 100 are selected such that the rate of the thermal expansion of the transition layer material is less than the rate of thermal expansion of the substrate material, and the rate of thermal expansion of the conductive layer material is less than the rate of thermal expansion of the transition layer material. As such, a reduction in expected life of thermally conductive layer 114 caused by the mismatch in rates of thermal expansion between thermally conductive layer 114 and substrate 102 during operation of electric machine 10 is substantially reduced.

Figure 4:
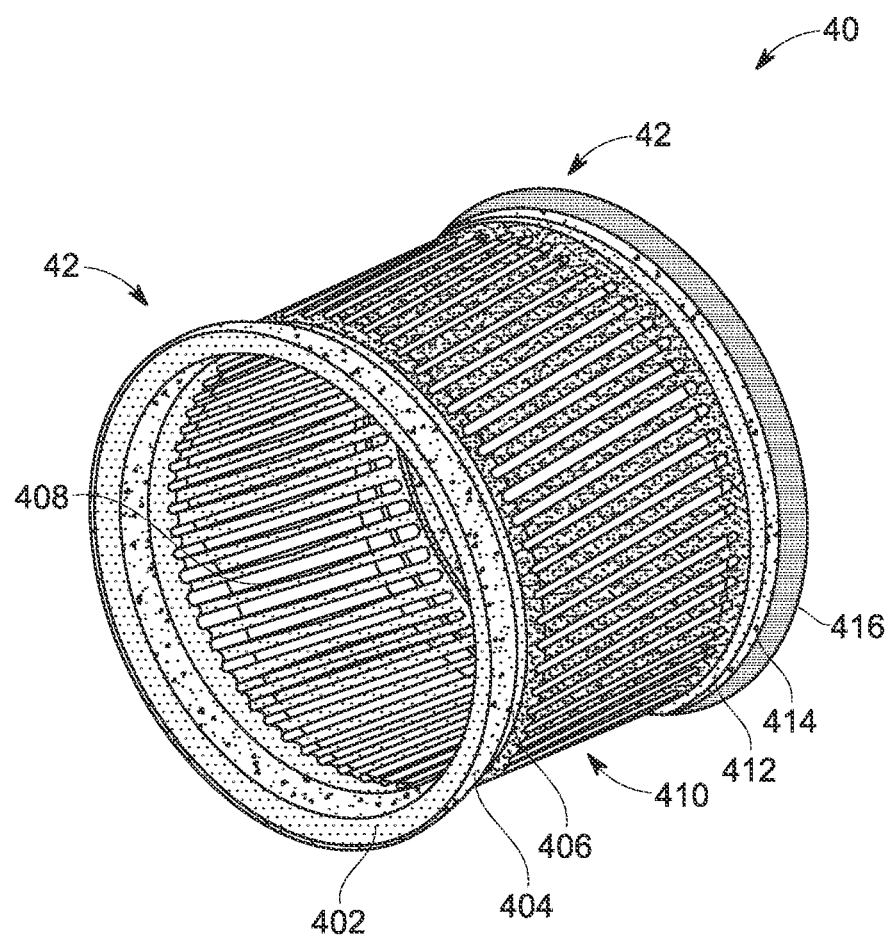
FIG. 4 is a schematic illustration of exemplary wire winding that may be used with the electric machine shown in FIG. 1.

FIG. 4 is a schematic illustration of wire winding 40 that may be used with electric machine 10 (both shown in FIG. 1). During operation of electric machine 10, temperature readings may be measured at different regions located on wire winding 40. In one embodiment, electric machine 10 may be a brushless direct current machine running at about 100 kiloWatts (kW). In the exemplary embodiment, wire winding 40 includes a first region 402, a second region 404, a third region 406, a fourth region 408, a fifth region 410, a sixth region 412, a seventh region 414, and an eighth region 416. Regions 402, 404, and 406, and regions 412, 414, and 416 are located at respective end-turns 42 of wire winding 40.

In one embodiment, thermal conductor 100 (shown in FIG. 2) may be positioned about end-turns 42, and temperature readings at regions 402-416 on wire windings 40 may be measured. In the exemplary embodiment, aluminum substrate 102 (shown in FIG. 3) has a thickness between about 5 mm and about 6 mm and a thermal conductivity of about 130 W/meters*Kelvin (W/m*° K), nickel-chromium alloy transition layer 112 (shown in FIG. 3) has a thickness of about 0.05 mm and a thermal conductivity that is expected to be at least about 50 W/m*° K, and aluminum oxide thermally conductive layer 114 (shown in FIG. 3) has a thickness of about 1 mm, a thermal conductivity of about 3.0 W/m*° K. Further, a thermal conductor fabricated from a polyimide material having a thickness of about 1 mm, and a thermal conductivity of about 0.15 W/m*° K may be positioned about end-turns 42, and temperature readings at regions 402-416 on wire windings 40 may be measured. The temperature readings are presented in Table 1 below.

TABLE 1

| | Material | |
| --- | --- | --- |
| Region | Polyimide | Aluminum Oxide |
| | Temperature in ° F. (° K) | |
| 402 | 454 (507) | 451 (506) |
| 404 | 464 (513) | 415 (486) |
| 406 | 454 (507) | 430 (494) |
| 408 | 444 (502) | 466 (515) |
| 410 | 395 (475) | 408 (482) |
| 412 | 454 (507) | 430 (494) |
| 414 | 464 (513) | 422 (490) |
| 416 | 473 (518) | 415 (486) |

As shown by the exemplary temperature readings in Table 1, using thermal conductor 100 in electric machine 10 facilitates increasing heat dissipation in the winding end-turns 42 of the electric machine 10. For example, when compared to an electric machine using a thermal conductor fabricated from a polyimide material at a lower power output, the temperature readings at regions 402, 404, and 406, and 412, 414, and 416 may be lower than the lower output electric machine. Moreover, while an increased power output in electric machine 10 may increase the temperature at region 408 when compared to the lower output electric machine, the external temperature increase of winding 40 at region 410 may be disproportionately low when compared to the temperature increase at region 408.

A method of forming thermal conductor 100 is also described herein. The method includes selecting a substrate, such as substrate 102 (shown in FIG. 2), and forming a thermal coating, such as thermally conductive coating 110 (shown in FIG. 2), on a surface of the substrate. In some embodiments, forming a thermal coating on a surface of the substrate includes applying transition material to an inner surface of the substrate, such as inner surface 104 (shown in FIG. 3), and applying conductive material to the applied transition material.

Transition material and conductive material may be applied to the inner surface of the substrate by any method that forms the thermal coating on the substrate at a substantially uniform thickness. In some embodiments, the transition material and the thermally conductive material are thermally sprayed onto the substrate using any known method. For example, the transition material and conductive material may each be heated to a predetermined temperature that at least partially melts the materials. The heated transition material may then be fed to a nozzle (not shown) and sprayed onto the substrate to deposit a transition layer thereon, such as transition layer 112 (shown in FIG. 3). The heated thermally conductive material may then be fed to the nozzle and sprayed towards the substrate to deposit a conductive layer, such as thermally conductive layer 114 (shown in FIG. 3), onto the transition layer. In the exemplary embodiment, either an atmospheric plasma spray (APS) and a high-velocity oxygen fuel (HVOF) spray method may be used to deposit the thermally conductive layer onto the transition layer.

The thermal conductor as described herein facilitates increasing the power density of an electric machine by dissipating heat from the wire winding end-turns of an electric machine more effectively than other known thermal conductors. In the exemplary embodiments, the thermal conductor is fabricated from an aluminum substrate, a layer of transition material, and a layer of thermally conductive, dielectric material that has a higher thermal conductivity than other known materials generally used within electric machines. As such, heat dissipation between the stator end-turn regions and the cooling jacket is facilitated to be improved. Accordingly, electric machines that use the thermal conductor described herein can produce a larger power output, or smaller electric machines may be fabricated to produce a substantially similar power output as larger electric machines that use material having a lower thermal conductivity.

An exemplary technical effect of the methods, systems, and apparatus described herein includes at least one of (a) improving heat dissipation from within an electric machine; (b) increasing the power output of known electric machines; and (c) reducing manufacturing time of the electric machine by fabricating a more easily installed thermal conductor.

Exemplary embodiments of the thermal conductor and electric machine are described above in detail. The thermal conductor and electric machine are not limited to the specific embodiments described herein, but rather, components of systems and/or steps of the methods may be utilized independently and separately from other components and/or steps described herein. For example, the thermal conductor may also be used in combination with other electric machines, and are not limited to practice with only the electric machines and methods as described herein. Rather, the exemplary embodiment can be implemented and utilized in connection with many applications where improving heat dissipation is desirable.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine, comprising:
  a housing;
  a stator core positioned within said housing;
  a wire wound about said stator core to form a plurality of end-turns that extend from an end of said stator core; and
  an annular thermal conductor positioned between said plurality of end-turns and said housing, said annular thermal conductor comprising a substrate having a thickness between 5 millimeters (mm) and 6 mm and a thermally conductive coating formed on an inner surface of said substrate, said thermally conductive coating comprising a thermally conductive, dielectric material configured to transfer heat from said plurality of end-turns to said substrate and having a thickness between about 0.25 mm and about 1.5 mm, wherein said thermally conductive coating further comprises a transition material applied to the inner surface of said substrate and fabricated from a nickel-chromium alloy or a metal-ceramic material, wherein said thermally conductive, dielectric material is applied to said transition material.

2. The electric machine in accordance with claim 1, wherein said substrate has a first rate of thermal expansion, said transition material has a second rate of thermal expansion that is less than the first rate of thermal expansion, and said thermally conductive, dielectric material has a third rate of thermal expansion that is less than the second rate of thermal expansion.

3. The electric machine in accordance with claim 2, wherein the first rate of thermal expansion is about $22.2*10^{-6}/°K$ and the third rate of thermal expansion is about $8.1*10^{-6}/°K$.

4. The electric machine in accordance with claim 1, wherein said substrate has a substantially cylindrical cross-sectional shape.

5. The electric machine in accordance with claim 1, wherein said substrate is fabricated from a metallic material.

6. The electric machine in accordance with claim 5, wherein the substrate is fabricated from aluminum, titanium, steel, or alloys thereof.

7. The electric machine in accordance with claim 1, wherein said thermally conductive, dielectric material is fabricated from at least one of an aluminum oxide material, a magnesium oxide material, diamond, boron nitride, aluminum nitride, a nitride-basedpowder, and combinations thereof.

8. The electric machine in accordance with claim 1, wherein the electric machine is one of an induction motor, a brushless direct current motor, an electrically commutated motor, a brushless alternating current motor, and a stepper motor.

9. The electric machine in accordance with claim 1; wherein the thermally conductive, dielectric material has a thickness defined within a range between about 0.5 and about 1.0 mm and the transition material has a thickness defined within a range between about 50 and about 200 μm.

10. The electric machine in accordance with claim 1, wherein the substrate has a thermal conductivity of about 130 W/m*° K, the transition material has a thermal conductivity of about 50 W/m*° K, and the thermally conductive, dielectric material has a thermal conductivity of about 3.0 W/m*° K.

* * * * *